Feb. 21, 1967     W. M. JOHNSON ETAL     3,305,259
METHOD OF ABSORBING SHOCK BETWEEN A BOAT AND OTHER OBJECTS
Filed Nov. 16, 1964
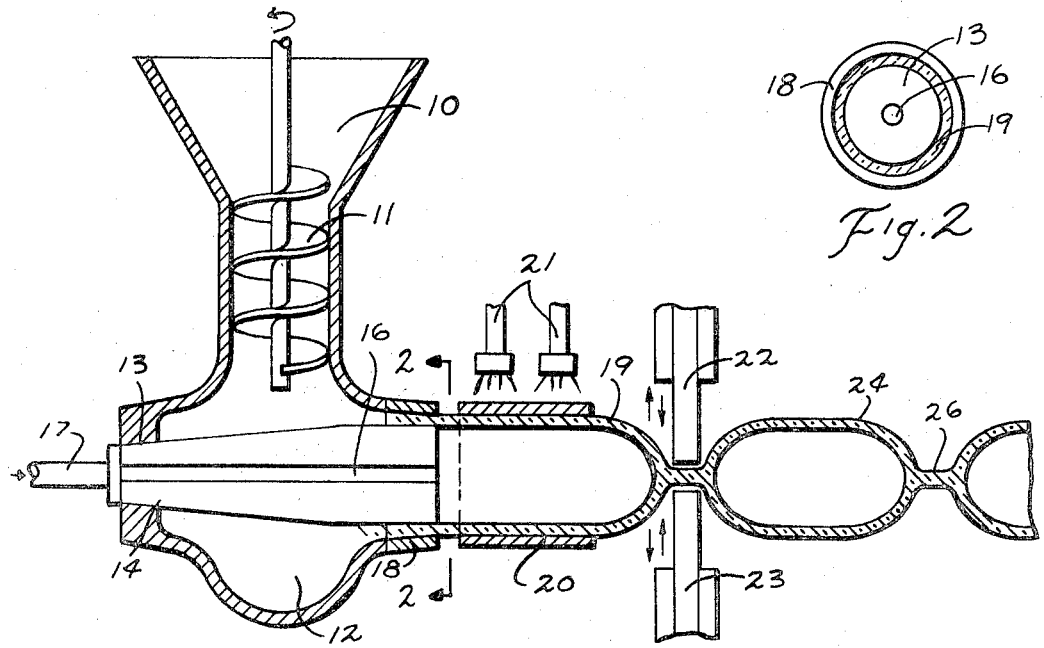
Fig. 1
Fig. 2
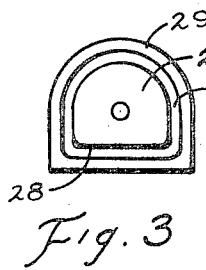
Fig. 3
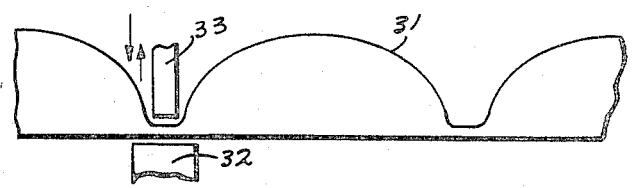
Fig. 4
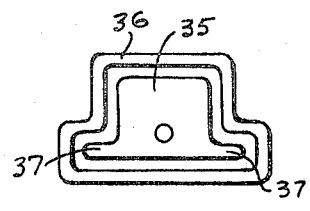
Fig. 5
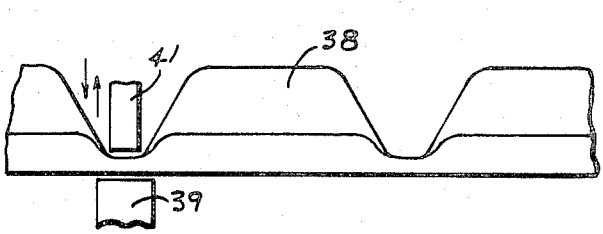
Fig. 6
INVENTORS
Wilber M. Johnson
BY Richard L. Johnson
Jennings, Carter & Thompson
Attorneys United States Patent Office 3,305,259
Patented Feb. 21, 1967

3,305,259
METHOD OF ABSORBING SHOCK BETWEEN
A BOAT AND OTHER OBJECTS
Wilber M. Johnson, Rte. 1, Box 56, Clermont, Fla. 32711,
and Richard L. Johnson, 15452 Wenhaven Drive,
Chagrin Falls, Ohio 44022
Filed Nov. 16, 1964, Ser. No. 411,227
3 Claims. (Cl. 293—71)

This invention relates to shock absorbing bumpers such as are employed as rub-rails for boats, bunks or cradles of boat trailers, the exposed edges of docks, pilings and the like, and for other uses where movable objects come in frictional contact with other objects, or wherever it becomes necessary to absorb shock when such objects come in more or less sharp contact with each other.

One object of this invention is to provide a shock absorbing bumper that may be produced inexpensively in continuous lengths and which may be cut to lengths to satisfy the needs of a particular use.

Another object of this invention is to provide a shock absorbing bumper in the form of a succession of gas inflated cells or chambers, made of a suitable elastic material and separated from each other by vulcanizing or by heat sealing.

In particular, our invention contemplates a shock absorbing bumper made of rubber, or of synthetic, elastic material in the form of continuous, connected, hollow, gas-filled links, or cells, and which may be conveniently manufactured and the links, or cells, inflated employing extrusion apparatus, with each link sealed from communication with adjacent links.

A still further object of our invention is to provide a shock absorbent article which may be manufactured and sold at less expense than such articles known to us and now on the market.

Briefly our invention comprises a continuous, elastic tubular shock absorbing article with the tube divided into cells at regular intervals, and with the cells inflated with a suitable gas, and to a suitable pressure, and hermetically sealed from each other. It is contemplated that our improved shock absorber will be made from rubber or other suitable thermoplastic materials having physical properties similar to rubber, and may conveniently be made by an extrusion process, although other methods of manufacture may suggest themselves to those skilled in the art.

Features embodying our invention are illustrated in the accompanying drawing forming a part of this application, in which FIG. 1 is a diagrammatic view, partly in section, illustrating one method by which our improved shock absorber may be made;

FIG. 2 is a sectional view taken along the line 2—2 of FIG. 1;

FIG. 3 is a view similar to FIG. 2, showing another form of our invention;

FIG. 4 is a diagrammatic view illustrating the manner in which the cells in the tube having the cross section of FIG. 3 may be formed and hermetically sealed from each other;

FIG. 5 is a view similar to FIG. 2 showing a still further form of our invention; and FIG. 6 is a view similar to FIG. 4 showing the manner in which the cells in the tube having the cross section of FIG. 5 may be formed and hermetically sealed from each other.

Referring to the drawing for a better understanding of our invention we show in FIG. 1, in diagrammatic form, extrusion apparatus including a hopper 10 into which the heated thermoplastic material is fed. A feed screw 11 forces the material downwards into an extrusion chamber 12. Mounted in the chamber 12 is a mandrel 13 having one end secured, as at 14, in the chamber wall. A passage 16 extends through the mandrel end to end through which air, or other suitable gas may be supplied from a conduit 17. At the opposite end of the extrusion chamber 12 is mounted a die 18 through which the material is forced in a tubular form around the mandrel 13.

The tube 19 formed as just described is passed through a cooling cylinder 20. Sprays 21 supply the necessary cooling fluid, whereby the tube 19 is cooled sufficiently to be self supporting. At 22 and 23 we show heating and vulcanizing members which are actuated by means, not shown, at regular intervals, to press the walls of the tube 19 together to form a hermetic seal. The action of the extrusion apparatus and the heating and vulcanizing members is continuous, whereby there is formed a continuous tubular member, divided into separate hermetically sealed cells or chambers 24.

As may be seen by reference to FIG. 2, the die 18 and mandrel 13 cooperate to form an annular passage thru which the thermoplastic material is extruded in the form of a cylinder which is later formed into cells or chambers with flattened ends 26 which cells are thus sealed from each other.

For some purposes a shock absorber with a flattened side is preferable. In FIG. 3 we show a mandrel 27 having a flattened side 28, and a corresponding die 29 forming a passage 31 with the mandrel. It will be understood that the mandrel 27 and die 29 would be in extrusion apparatus instead of the mandrel 13 and die 19 such as shown in FIG. 1. It will also be understood that the cooling tube employed at the exit of the extrusion apparatus would conform in shape to the extruded tube. In FIG. 4 we show the tube 31 which would be formed by the mandrel 27 and die 29. With this form of shock absorber, a stationary heating and vulcanizing element 32 is provided to cooperate with a vertically movable element 33 which operates at regular intervals to form and seal the cells from each other.

In FIG. 5 we show a still further form of mandrel 35 and die 36 which forms a tubular shock absorber especially adapted for use against a flat surface. This form, as shown, is generally rectangular in shape and is provided with lateral flanges 37 at its lower corners, as shown in the drawing. The extruded tube 38, shown in FIG. 6, is divided into cells which are hermetically sealed from each other by means of heating and vulcanizing elements 39 and 41, similar to those shown in FIG. 4, which operate at regular intervals to form and seal the cells from each other.

The advantages of our improved shock absorbing bumpers will be obvious. They are economical of manufacture and may be made in lengths best adapted for their contemplated use. The cells, which may be inflated at atmospheric pressure or above by means similar to those shown, or by other means which will suggest themselves to those skilled in the art, are extremely efficient in absorbing shocks, and the tubes may be formed of any thickness or strength necessary to meet the required use.

It will be understood that the method of manufacture herein shown is for illustrative purpose only and forms no part of our invention and that other methods of forming and inflating the tubes will suggest themselves to those skilled in the art.

While we have shown our invention in only three forms, it will be obvious to those skilled in the art that it is not so limited, but that it is susceptible of various changes and modifications without departing from the spirit thereof, and we desire therefore, that only such limitations shall be placed thereupon as are specifically set forth in the appended claims.

What we claim is:

1. The method of absorbing shock between a boat and other objects which comprises interposing between the boat and said other objects a continuous gas-containing elastic tube which is divided into compartments hermetically sealed from each other.

2. The method of claim 1 in which the compartments of said tube are inflated to above atmospheric pressure.

3. The method defined in claim 2 in which the continuous gas-containing elastic tube is generally rectangular in cross section and is provided with lateral outwardly extending flanges along opposite sides of said tube to form a wider bearing surface.

References Cited by the Examiner

UNITED STATES PATENTS

| | | | |
|---|---|---|---|
| 456,705 | 7/1891 | Myers | 152—333 X |
| 468,971 | 2/1892 | Myers | 152—333 X |
| 487,419 | 12/1892 | Lee | 152—333 X |
| 1,216,893 | 2/1917 | Vierengel | 152—333 |
| 1,233,143 | 7/1917 | Teresa | 152—333 |

ARTHUR L. LA POINT, *Primary Examiner.*

MILTON BUCHLER, *Examiner.*

R. M. WOHLFARTH, *Assistant Examiner.*